United States Patent [19]

Baba et al.

[11] 4,153,830
[45] May 8, 1979

[54] WELDING APPARATUS

[75] Inventors: Toshihiko Baba; Akiyoshi Uomori; Tadayasu Tsuchitani, all of Amagasaki, Japan

[73] Assignee: Mitsubishi Denki Kabushiki Kaisha, Tokyo, Japan

[21] Appl. No.: 839,450

[22] Filed: Oct. 5, 1977

[30] Foreign Application Priority Data

Oct. 7, 1976 [JP] Japan ................. 51-121081

[51] Int. Cl.² .................................... B23K 11/02
[52] U.S. Cl. .................................... 219/101; 219/161
[58] Field of Search ................. 219/101, 103, 79, 161, 219/125.1

[56] References Cited

U.S. PATENT DOCUMENTS

| 3,036,203 | 5/1962 | Jacob | 219/101 |
| 3,036,204 | 5/1962 | Strglitz | 219/101 |
| 4,063,061 | 12/1977 | Fuijimo | 219/101 |

Primary Examiner—E. A. Goldberg
Attorney, Agent, or Firm—Oblon, Fisher, Spivak, McClelland & Maier

[57] ABSTRACT

A welding apparatus comprises a pair of suspension type electrode press devices for clamping an upper electrode and a lower electrode in perpendicular relation to workpieces for synchronizing them, whereby a clamping force is treated as the inner force of the pushing mechanism and the apparatus can be miniaturized. The surfaces of the workpieces can be uniformly clamped by the upper and lower electrodes whereby the consumptions of the upper and lower electrodes are substantially the same and the calibration of the positions of the upper and lower electrodes for consumption is not required.

The welding apparatus is especially effective for continuous rolling in single or plural lines of a rolling apparatus for rolling hot steel billets, etc. and welding them.

3 Claims, 6 Drawing Figures

FIXED SIDE / SLIDING SIDE

WELDING APPARATUS

BACKGROUND OF THE INVENTION

1. Field of the Invention

The present invention relates to a welding apparatus for welding steel billets, etc. More particularly, it relates to a welding apparatus which is used in a continuous rolling operation.

2. Description of the Prior Art

Referring to FIGS. 5 and 6, the conventional welding apparatus for welding steel billets etc. will be illustrated.

In FIGS. 5 and 6, the reference numeral (101) designates a main frame which is a base for holding the body of the welding apparatus and is suspended on a truck (not shown); (102) designates a C type or bridge type press frame in the stationary side which is fixed on the main frame (101); (103) designates a C type or bridge type press frame in the moving side which is fitted to a slide frame (104) sliding in guides (105) fixed on both sides of the main frame (101); (106) designates a clamp cylinder assembled in the press frames (102), (103). The clamp cylinder has the function to forcibly clamp a workpiece (110) positioned on a lower electrode (108') fixed on the lower part of the press frames (102), (103) or the upper part of the main frame (101) between the lower electrode and an upper electrode (108) connected to the cylinder rod. The reference numeral (107) designates an up-set cylinder which is connected to the main frame (101). The up-set cylinder (107) is used for moving the workpiece (110) clamped by the electrodes on the fixed press frame (102) under pushing by the workpiece (110') clamped by the electrodes on the moving frame (103) for welding the workpieces clamped between the upper and lower electrodes (108), (108') by feeding a desired current from a transformer (109) assembled in the main frame (101) to the electrodes (108), (108').

In order to weld hot steel billets in the rolling line by the conventional welding apparatus, the welding should be carried out under travelling the welding apparatus held on the truck. The following disadvantages have been found when the conventional welding apparatus is used.

(1) The lower electrode is not sunk, whereby the lower surface of the workpiece is contacted with the electrode during the time for inserting and taking out the workpiece to cause trouble.

(2) The electrode pressing force of the clamp cylinder is applied not only to the press frames (102), (103) but also to the main frame (101), whereby the structural strength of the frames being proportional to the electrode pressing force is required not only for the press frames but also for the other frames.

(3) The center of the workpiece and the center of the upset cylinder and the central axis of the guide are not easily positioned on one line (linear), whereby the structural strength of the main frame being proportional to the up-setting force is required.

(4) The line of the circuit between the transformer and the electrodes is long, whereby a transformer having a large capacity is required.

(5) The weight and size of the welding apparatus should be large in order to satisfy the requirements (1) to (4). It is difficult to minimize the width of the welding apparatus, whereby it is difficult to use the conventional welding apparatus in a rolling system having plural lines.

(6) The parts of the welding apparatus below the workpieces are large, whereby it is not easy to remove the fallen scales and the flush sputters, etc.

SUMMARY OF THE INVENTION

It is an object of the present invention to provide a novel welding apparatus which does not have the disadvantages of the conventional welding apparatus and which can be miniaturized and has economical and industrial advantages.

The welding apparatus of the present invention comprises a pair of suspension type electrode press devices comprising a clamp cylinder suspending from the base through a link mechanism;

a slide frame connected to the clamp cylinder body to shift vertically with the cylinder body;

an upper press frame having an upper electrode which is connected to a cylinder rod of the press cylinder so as to shift in the slide frame by the cylinder rod;

a lower press frame having a lower electrode which is fixed on the slide frame to shift with the slide frame and is faced to the upper electrode. The welding apparatus also comprises an up-setting mechanism for moving one of the pair of electrode press devices in the direction of the other electrode press device in the horizontal direction. The clamp cylinder body and the cylinder rod are vertically shifted to the opposite direction by actuating the clamp cylinder to perform the clamping operation of the upper electrode and the lower electrode in perpendicular to a workpiece under synchronizing them. The base comprises the beam for travelling and the frame for the truck which is suspended on the beam so as to move the welding apparatus. The up-setting mechanism comprises a pair of up-set push cylinders which are respectively connected to the upper press frame and the lower press frame.

The welding apparatus of the present invention has the suspension type electrode press device wherein the upper and lower electrodes are moved while being synchronized and the clamping force is treated as the inner force of the clamping mechanism so as to provide a welding apparatus which does not have the disadvantages of the conventional welding apparatus and which can be miniaturized and has economical and industrial advantages.

DETAILED DESCRIPTION OF THE PREFERRED EMBODIMENTS

Figure 1:
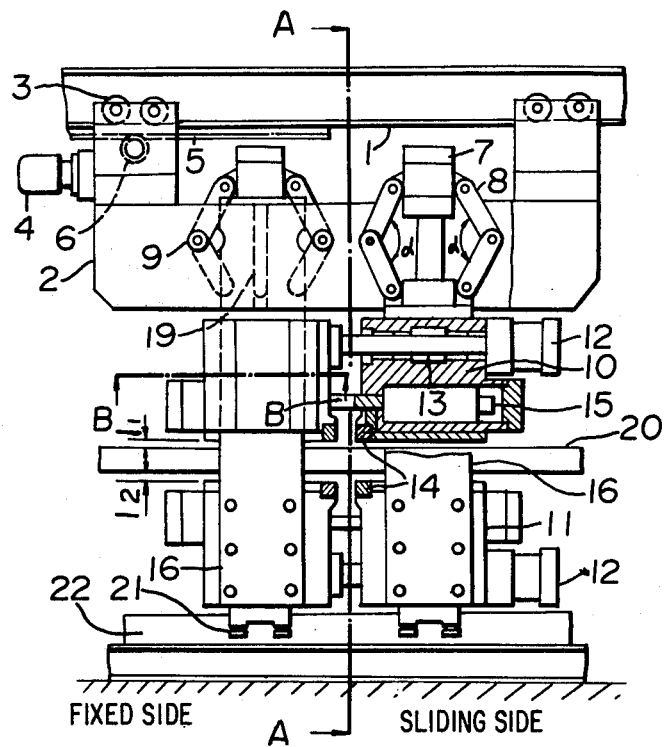
FIG. 1 is a partial sectional front view of one embodiment of the present invention.
Figure 2:
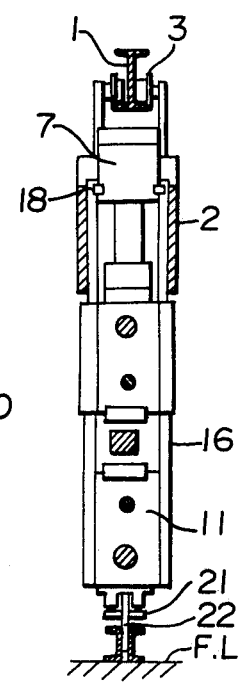
FIG. 2 is a partial sectional view taken along the A-A line of FIG. 1.

Referring to the drawings, the present invention will be illustrated.

Figure 3:
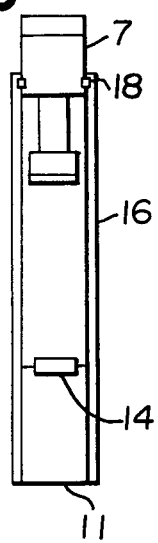
FIG. 3 is a side view of the slide flame part.
Figure 4:
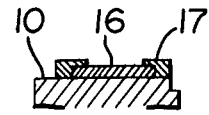
FIG. 4 is a sectional view taken along the B-B line of FIG. 1.
Figure 5:
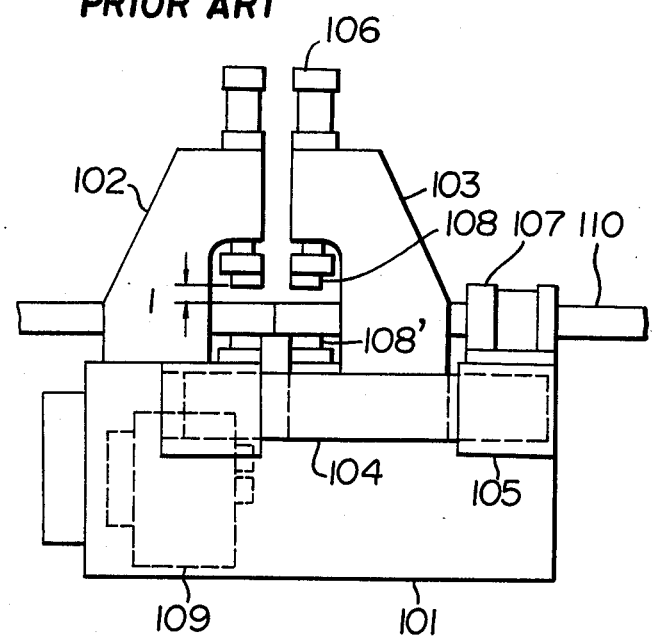
FIG. 5 is a front view of the conventional welding apparatus.
Figure 6:
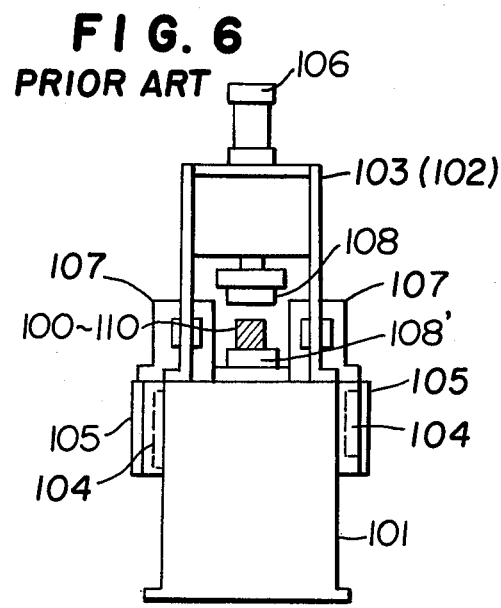
FIG. 6 is a side view of the apparatus of FIG. 5.

In FIGS. 1 to 4, the reference numeral (1) designates a beam for travelling a truck, and the beam is fixed on a ceiling or stanchions; (2) designates a truck frame which is suspended on the beam (1); (3) designates wheels for travelling on the rail of the beam (1); (4) designates a truck driving device for travelling the truck frame (2) by driving a pinion (6) interlocking to a rack (5) fixed on the beam (1); (7) designates a clamp cylinder for clamping electrodes (14) against a workpiece (20), the electrodes being connected to an upper press frame (10) and a lower press frame (11); (8) designates a clamp synchronizing mechanism for synchronizing the moving distances $l_1$, $l_2$ of the press frames (10) (11) to give $l_1 \times l_2$; (9) designates a roller which is assembled in the clamp synchronizing mechanism (8) to hold the weights of the press frames (10), (11) and which slides in a groove formed on the truck frame (2); (12) designates an up-set cylinder for moving the press frames (10), (11) equipped with the electrodes in the forizontal direction; (13) designates an up-set guide rod which is directly connected to the rod of the up-set cylinder (12) at one end and is stationary on the fixed side of the press frame at the other end and the rod (13) is used for synchronizing the clamping operations of the stationary side and the moving side of the press frame and is also used as a slide guide for the moving side of the press frame during the flush-up-set operation. The reference numeral (15) designates a transformer for welding which is kept in the press frame; (16) designates a slide frame for clamping the electrodes and synchronizing the press frames (10), (11) and the lower end of the slide frame is fixed on the lower press frame (11) and the upper end of the slide frame is fixed through a key (18) on the clamp cylinder (7) as shown in FIG. 3 and the middle part of the slide frame is slided under the guide by a guide plate fixed on the upper press frame (10), as shown in FIG. 4. The reference numeral (19) designates a key for setting the position of the truck frame (2) to the stationary side of the press frame; (21) designates rollers for preventing the rolling of the welding apparatus, the rollers being disposed on the lower surface of the lower press frame (11), the truck travelling under the condition holding a guide plate (22) by the rollers from both sides and the guide plate (22) being fixed on the base in parallel to the beam.

The welding apparatus of the present invention has the above-mentioned structure. In the synchronizing operation for clamping the upper and lower electrodes, when the workpiece (20) is at the position for clamping it, a hydraulic oil is fed into the clamp cylinder (7). The cylinder rod is pushed out to initiate lowering of the upper press frame (10) fixed on the end of the cylinder rod, whereby the angle $\alpha$ of the link of the synchronizing mechanism (8) is increased. However, the movement of the roller (9) at the joint of the link is limited to the horizontal direction, whereby the clamp cylinder (7) which is at a higher level than the level of the position of the roller is upwardly moved and the lower press frame (11) fixed through the slide frame (16) to the clamp cylinder is raised. In this case, when all of the links have the same length, it is possible to clamp the workpiece under the condition that the falling or lowering distance $l_1$ of the upper press frame (10) is always equal to the rising distance $l_2$ of the lower press frame (11).

In the welding operation, one workpiece is held by the electrodes in the stationary side and the other workpiece is held by the electrodes in the moving side. The latter workpiece is slided against the former workpiece by the clamping operations of the stationary side and the moving side of the press frame by the up-set cylinder (12) and the rod of the cylinder (13), though both the stationary side and the moving side are held on one truck frame (2). Accordingly, the welding operation can be carried out during the time for moving the truck frame (2) which holds two workpieces respectively on the stationary side and the moving side.

As described above, in accordance with the present invention, the electrodes pressing device is of the suspension type and the upper and lower electrodes perpendicularly clamp the workpiece under into synchronizing relation, whereby the clamping force can be treated as the inner force of the clamping mechanism so as to miniaturize the apparatus. The clamp surfaces of the workpieces are uniformly clamped whereby the consumptions of the upper and lower electrodes are substantially the same, so as to eliminate the calibration of the positions of the surfaces of the upper and lower electrodes for the consumptions. A space of the floor-base is broaded whereby the treatments of scale and flush sputter can be easily worked to eliminate the disadvantages of the conventional welding apparatus. The welding apparatus of the present invention is especially effective for continuous rolling in single or plural lines of the rolling apparatus for rolling hot steel billets in welding them.

What is claimed as new and desired to be secured by Letters Patent of the United States is:

1. A welding apparatus which comprises (a) a pair of suspension type electrode press devices comprising:
    a clamp cylinder having a protractable cylinder rod;
    a link mechanism connected to said clamp cylinder for shifting said clamp cylinder in the vertical direction;
    a slide frame connected to said clamp cylinder body, said slide frame being shiftable in the vertical direction with said cylinder body;
    an upper press frame having an upper electrode, said upper press frame movably disposed in said slide frame and connected to the cylinder rod of said clamp cylinder, said upper frame being moved in said slide frame when the cylinder rod is protracted;
    a lower press frame having a lower electrode, said lower press frame fixed on said slide frame to shift with said slide frame, and the lower electrode faced to said upper electrode; and
    (b) an up-setting mechanism for moving one of said pair of electrode press devices in the direction of the other electrode press device in the horizontal direction,
    whereby the clamping operation of said upper electrode and said lower electrode in perpendicular relation to a workpiece is performed synchronously.

2. A welding apparatus according to claim 1 including:
    a beam for transporting a truck and a truck frame which is suspended on said beam, said link mechanism being connected to said truck frame whereby said welding apparatus can be moved.

3. A welding apparatus according to claim 1 wherein said up-setting mechanism comprises a pair of up-set push cylinders which are respectively connected to said upper press frame and said lower press frame.

* * * * *